(12) United States Patent
Foster et al.

(10) Patent No.: US 10,731,331 B2
(45) Date of Patent: Aug. 4, 2020

(54) SOCK ANCHOR UNIT

(71) Applicants: Terence Foster, Ely, Cambridgeshire (GB); Benoit Pierre Augustin Pericard, Cisse, Puy Lonchard (FR); Ian Stewart Alexander Murray, Ryde Isle of Wight (GB)

(72) Inventors: Terence Foster, Cambridgeshire (GB); Benoit Pierre Augustin Pericard, Cisse (FR); Ian Stewart Alexander Murray, Ryde Isle of Wight (GB)

(*) Notice: Subject to any disclaimer, the term of this patent is extended or adjusted under 35 U.S.C. 154(b) by 0 days.

(21) Appl. No.: 16/478,775

(22) PCT Filed: Jan. 17, 2018

(86) PCT No.: PCT/GB2018/050121
§ 371 (c)(1),
(2) Date: Jul. 17, 2019

(87) PCT Pub. No.: WO2018/134578
PCT Pub. Date: Jul. 26, 2018

(65) Prior Publication Data
US 2019/0360193 A1    Nov. 28, 2019

(30) Foreign Application Priority Data

Jan. 17, 2017 (GB) .................................. 1700743.6

(51) Int. Cl.
*E04B 1/41* (2006.01)
*E04G 23/02* (2006.01)
(Continued)

(52) U.S. Cl.
CPC ........ *E04B 1/4121* (2013.01); *E04G 23/0211* (2013.01); *E04C 5/165* (2013.01);
(Continued)

(58) Field of Classification Search
CPC ............... E04B 1/4121; E04G 23/0211; E04G 23/0222; E04G 23/0218; E04G 23/02;
(Continued)

(56) References Cited

U.S. PATENT DOCUMENTS

| 1,603,375 A | 10/1926 | Clowes |
| 3,877,235 A * | 4/1975 | Hill .................. E21D 20/025 |
| | | 405/259.6 |

(Continued)

FOREIGN PATENT DOCUMENTS

EP    0330114 A1    8/1989

OTHER PUBLICATIONS

EP0330114, machine translation (Year: 2019).*
(Continued)

*Primary Examiner* — Brent W Herring
(74) *Attorney, Agent, or Firm* — Perkins IP Law Group LLC; Jefferson Perkins

(57) ABSTRACT

A sock anchor unit (10) comprises an inner longitudinal hollow spine (12), an outer fabric sleeve (14) arranged to envelop the outside surface of the inner hollow spine (12) such that a gap is defined between the outside surface of the inner hollow spine (12) and an inner surface of the outer fabric sleeve (14) and a plurality of elongated reinforcing members (22), wherein each elongated reinforcing member (22) extends longitudinally within the gap.
The inner hollow spine (12) comprises at least one substantially laterally extending opening from inside to outside of the inner hollow spine (12). The opening allows cementitious fluid which is pumped into the anchor unit to fill the gap between the hollow spine (12) and outer fabric sleeve. A fastening member (28, 32) is provided on each end of the sock anchor unit (10). Both fastening members (28, 32) are compatible with each other and each fastening member (28, (Continued)

32) is configured such that a trailing end of a first sock anchor unit (10) is attachable to a leading end of a second sock anchor unit (10) thereby facilitating creating a multiple piece sock anchor system of a desired length.

23 Claims, 3 Drawing Sheets

(51) Int. Cl.
*E21D 21/00* (2006.01)
*E04C 5/16* (2006.01)
*F16B 2/24* (2006.01)

(52) U.S. Cl.
CPC ...... *E04G 23/0222* (2013.01); *E21D 21/0073* (2016.01); *F16B 2/248* (2013.01)

(58) Field of Classification Search
CPC ........ F16B 2/248; F16B 13/146; E04C 5/165; E04C 5/02; E21D 21/0073
USPC .......... 52/514, 514.5, 742.1, 742.14, 742.15, 52/250, 253, 649.1, 649.2, 649.3, 649.8, 52/848
See application file for complete search history.

(56) References Cited

U.S. PATENT DOCUMENTS

| | | | | | |
|---|---|---|---|---|---|
| 4,023,373 | A | * | 5/1977 | Hipkins | E21D 20/026 405/259.6 |
| 4,773,794 | A | * | 9/1988 | Harke | E04G 23/0203 405/259.5 |
| 5,216,857 | A | * | 6/1993 | Harke | E04C 3/02 52/223.6 |
| 6,581,343 | B1 | * | 6/2003 | Metelli | E04B 7/022 403/170 |
| 8,375,678 | B1 | * | 2/2013 | Ferrer | E04C 5/165 52/414 |
| 8,381,479 | B1 | * | 2/2013 | Ferrer | E04C 5/165 52/414 |
| 8,806,836 | B2 | * | 8/2014 | James | E04G 23/0222 52/698 |
| 8,857,122 | B2 | * | 10/2014 | Wathne | E04B 1/38 405/259.5 |
| 9,303,399 | B2 | * | 4/2016 | Espinosa | E04B 1/4114 |
| 9,388,591 | B2 | * | 7/2016 | Wathne | E04B 1/38 |
| 10,202,753 | B2 | * | 2/2019 | Espinosa | E04B 1/4114 |
| 2002/0062622 | A1 | * | 5/2002 | Bell | E02D 35/00 52/741.15 |
| 2012/0227351 | A1 | * | 9/2012 | James | E04B 1/4157 52/705 |
| 2012/0317920 | A1 | * | 12/2012 | Wathne | E04B 1/38 52/699 |
| 2014/0157717 | A1 | * | 6/2014 | Espinosa | E04B 1/4114 52/700 |
| 2014/0360129 | A1 | * | 12/2014 | Berset | E04G 23/0218 52/745.19 |
| 2015/0007526 | A1 | * | 1/2015 | Wathne | E04B 1/38 52/745.21 |
| 2017/0022701 | A1 | * | 1/2017 | Espinosa | E04B 1/4114 |
| 2019/0161959 | A1 | * | 5/2019 | Espinosa | E04B 1/4114 |
| 2019/0211675 | A1 | * | 7/2019 | Ravencroft | E21D 21/0073 |
| 2020/0040593 | A1 | * | 2/2020 | Schmidt | E04G 23/0218 |

OTHER PUBLICATIONS

International Searching Authority, International Search Report and Written Opinion of the International Searching Authority, dated Apr. 3, 2018, 14 pages.

\* cited by examiner

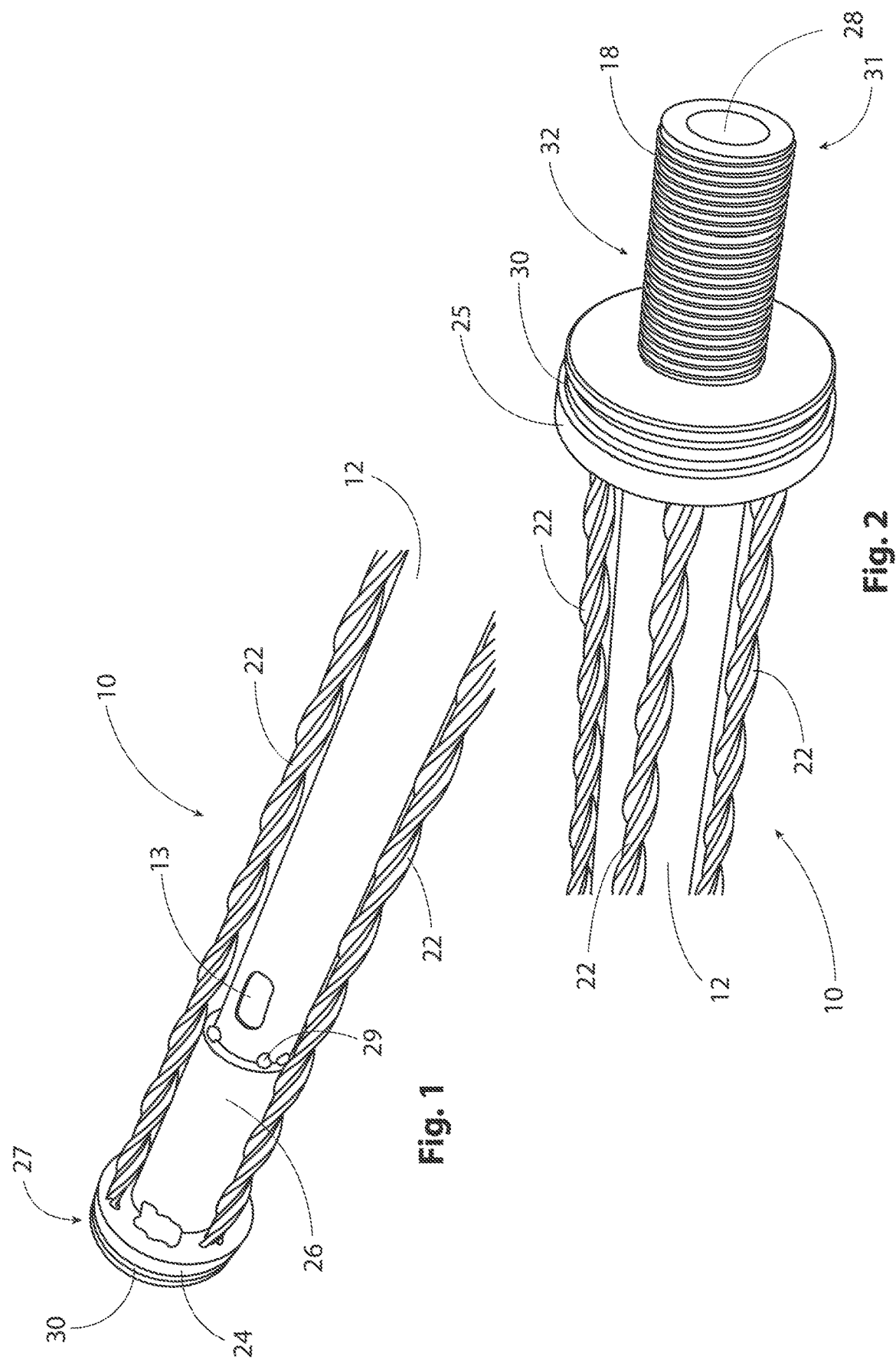

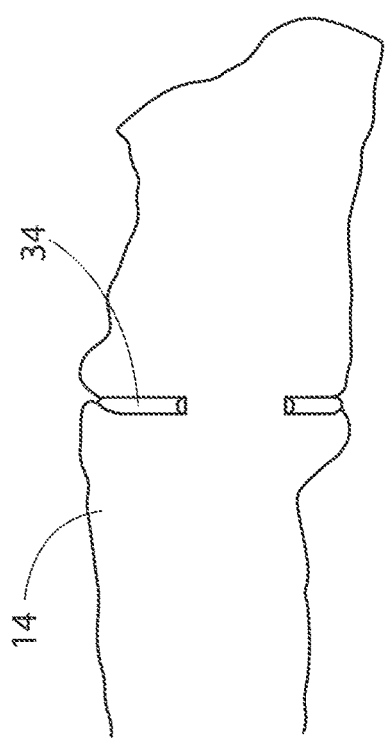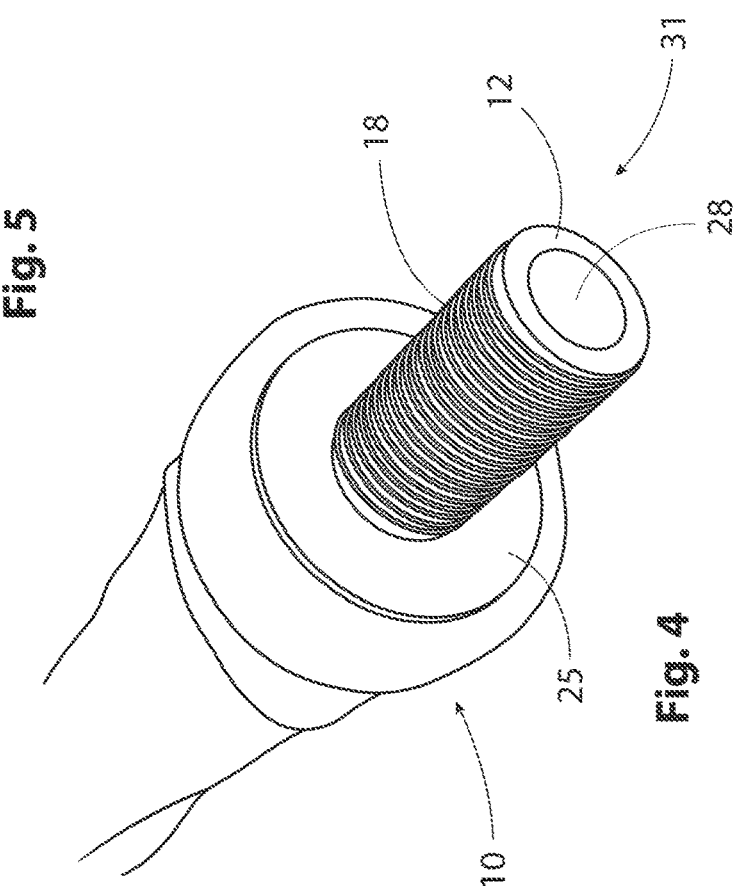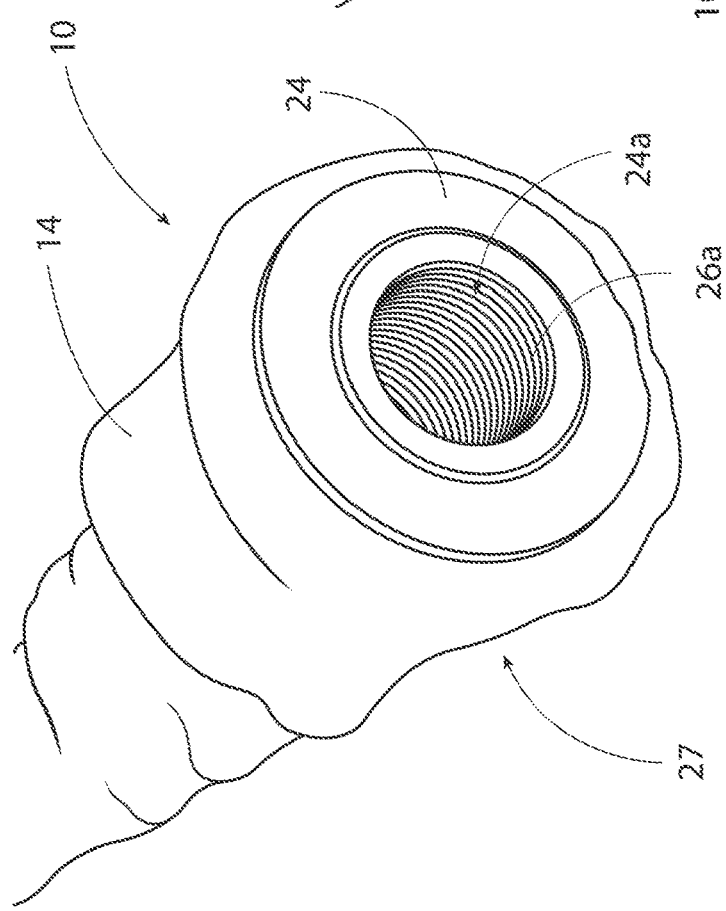

SOCK ANCHOR UNIT

FIELD OF INVENTION

The present invention relates to a product and process for reinforcing and repairing masonry, concrete or brick structures. In particular, the invention relates to a portable sock anchor unit that can be joined to one or more additional sock anchor units to form a repair system of a desired length.

BACKGROUND TO THE INVENTION

Sock anchors are known for repairing, by reinforcement, masonry, concrete and brick structures.

Typically, sock anchors are made of a rigid bar or rod, which is covered in a fabric sock. The sock anchor is inserted into an elongated cavity in the building or structure for repair or reinforcement. The cross-sectional dimension of the cavity is larger than the cross-sectional dimension of the sock anchor unit, such that the cavity can be filled with cementitious material which embeds the sock anchor in the cavity to reinforce the structure in which the cavity is created. The cavity is typically created in an area of damage, weakness or subsidence in a structure such that the sock anchor unit can be embedded within the structure to repair and reinforce the damaged area. Sock anchors can often be used such that full demolition and rebuild of a part of a structure can be avoided.

A sock anchor device operates by inserting the anchor system into a cavity before injecting the anchor device with cementitious grout. The cementitious grout is typically pumped into the anchor via a plastic tube such that the volume occupied by the sock is filled to expand the sock to fill the cavity surrounding the rigid bar or rod. The sock material is flexible and porous such that the sock deforms to the shape and form of the cavity to provide mechanical and chemical bonding of the anchor device to the internal surface of the cavity. The sock material typically acts to contain the cement to avoid seepage of the cement into small cracks extending from the cavity surface into the structure because such seepage may result in crack propagation and failure of the structure surrounding the anchor.

SUMMARY OF THE INVENTION

A first aspect of the present invention provides a sock anchor unit comprising:
 an inner longitudinal hollow spine comprising at least one substantially laterally extending opening from inside to outside of the inner hollow spine;
 an outer fabric sleeve arranged to envelop the outside surface of the inner hollow spine such that a gap is defined between the outside surface of the inner hollow spine and an inner surface of the outer fabric sleeve;
 a plurality of elongated reinforcing members, wherein each elongated reinforcing member extends longitudinally within the gap between the inner hollow spine and the outer fabric sleeve; and
 a fastening member on each end of the sock anchor unit, wherein both fastening members are compatible with each other and each fastening member is configured such that a trailing end of a first anchor unit is attachable to a leading end of a second anchor unit thereby facilitating creating a sock anchor system of a desired length comprising a plurality of sock anchor units.

A sock anchor unit, according to the first aspect of the present invention, improves manufacturability and transportation of sock anchor devices because the first aspect of the present invention provides a sock anchor unit that can be manufactured as relatively short lengths, for example 250 mm, 500 mm, 750 mm, 1000 mm etc. These short lengths can be joined together end to end when delivered to site.

It will be appreciated that short lengths can be more easily transported than a long unit; three metres is understood to be a typical length of presently available anchor devices.

Another benefit of the multiple unit system, facilitated by combining a plurality of sock anchor units per the first aspect, is that a longer anchor device can be created and assembled on site. Accordingly, any problems associated with manufacturability and transportation of a longer unit is avoided.

It will be appreciated, that there are commercial benefits from the provision of short, attachable/detachable units because waiting times, for an anchor unit of longer length, for example three or more metres, can be reduced or abolished because it is conceived that individual sock anchor units can be pre-manufactured, off-the shelf, units. Therefore, a customer can specify the length required and an appropriate quantity of sock anchor units can be shipped to site, for joining together on site to arrive at the desired length.

Some of the benefits of a sock anchor unit according to a first aspect of the present invention are: improved handling and improved transportation, due to the shorter lengths; less expense, due to reduced manufacturing costs and less waiting time; certainty that the cementitious material fully fills the cavity and a more robust anchor device, due to the provision of the inner longitudinal spine.

Cementitious material is added to the sock anchor unit by pumping cementitious material into the inside of the inner hollow spine, wherein the laterally extending opening allows the cementitious material to flow into the gap between the inner hollow spine and the outer fabric sleeve.

As described above the outer fabric sleeve is configured to deform to take up the shape of the cavity in which it is inserted and the cementitious material fills the inner member and the cavity in which the sock anchor unit or system, comprising a plurality of units is inserted. When the cementitious material sets or cures, it will be appreciated that the inner hollow spine becomes enveloped in cement and therefore aids the mechanical strength provided by the embedded sock anchor unit or system.

The fastening members may comprise threaded members, wherein an internal thread is provided on the fastening member on a first end of the sock anchor unit and an external thread is provided on the fastening member on a second end of the sock anchor unit, wherein two or more sock anchor units can be joined together by attaching the internal threaded end of a first sock anchor unit to the external threaded end of a second sock anchor unit.

The fastening members may be part of the inner hollow spine, wherein the inner hollow spine may comprise a section of increased cross-sectional area at the first end, wherein the internal thread is provided on the inner surface of the section of increased cross-sectional area. Alternatively, or in addition, the inner hollow spine may comprise a section of reduced cross-sectional area at the second end, wherein the external thread is provided on an outer surface of the section of reduced cross-sectional area and the internal thread is provided on the first end of the inner hollow spine.

One fastening member may be provided by an internally threaded sleeve, wherein at least one end of the inner hollow spine includes an externally threaded portion, wherein the externally threaded portion of the inner hollow spine is receivable in one end of the internally threaded sleeve and a first end of a second sock anchor is receivable in the other end of the internally threaded sleeve.

The sock anchor unit may further comprise a cap on each end, wherein the outer fabric sleeve is secured at each end to each cap thereby facilitating connection of the outer fabric sleeve to the sock anchor unit.

Each cap may comprise a circumferential groove configured to receive portion of the fabric outer sleeve and a mechanical fastener, wherein the mechanical fastener is arranged to secure the outer fabric sleeve to each cap by clamping the portion of the outer fabric sleeve within the groove, wherein the portion of outer fabric sleeve is sandwiched between the cap and the mechanical fastener.

The mechanical fastener may be a resilient member that is received within the groove and is operable to clamp the portion of the outer fabric sleeve within the groove, between the cap and the mechanical fastener. The mechanical fastener may be a circlip.

A longitudinal axis of each elongated reinforcing member may be substantially parallel to a longitudinal axis of the hollow spine.

Each elongated reinforcing member may extend between the inner faces of each cap. The elongated reinforcing members may be axially aligned and circumferentially distributed relative to the inner hollow spine.

The inner hollow spine and the reinforcing members may be metal, for example steel, mild steel, stainless steel etc.

The reinforcement member or members may comprise a textured surface finish. The reinforcement member may comprise, for example a spiral rod. Alternatively, the reinforcement member may comprise a screwed or serrated rod. A textured surface finish may improve mechanical and chemical bonding of the cementitious material to the components of the sock anchor unit and the cavity in which the sock anchor unit or system is inserted.

A sock anchor unit may comprise at least three reinforcement members.

When cementitious material is added to the anchor device via the central spine the cementitious material will envelop the reinforcement members and the inner hollow spine to aid the mechanical strength provided by the embedded sock anchor unit or system.

The fastening members may comprise an internal connection at a first end of the sock anchor unit and a protruding connection at a second end of the sock anchor unit.

The protruding connection may protrude from an external face of one of the caps.

The protruding connection may comprise an end of the inner hollow spine, which passes through the cap.

The protruding connection may comprise an external threaded connection on a trailing end of the sock anchor unit, wherein the external threaded connection is operable to join with an internal threaded connection at the leading end of another sock anchor unit.

The sock anchor unit may comprise an inner hollow spine of between 250 mm and 1000 mm long.

A further aspect of the present invention provides a sock anchor system comprising two or more sock anchor units according to the first aspect, wherein a trailing end of a first anchor unit is fastened to a leading end of a second anchor unit.

A further aspect of the present invention comprises a method of reinforcing or repairing a structure comprising the steps of:

forming a cavity in the structure for repair;

creating a sock anchor system for insertion into the cavity, wherein the sock anchor system includes at least one sock anchor unit or two or more anchor units joined together end to end, wherein each sock anchor unit comprises an inner elongated hollow spine comprising at least one substantially laterally extending opening from inside to outside of the inner hollow spine; an outer fabric sleeve enveloping the outside surface of the inner hollow spine thereby defining a gap between the inner hollow spine and the outer fabric sleeve; a plurality of elongated reinforcing members, wherein each elongated reinforcing member extends longitudinally within the gap; and a fastening member on each end of the sock anchor unit, wherein both fastening members are compatible with each other and each fastening member is configured such that a first end of a first anchor unit is attachable to a second end of a second anchor unit thereby facilitating creating a sock anchor system of a desired length comprising a plurality of sock anchor units;

inserting the sock anchor system into the cavity; and pumping a fluid cementitious material into the inner hollow spine such that the fluid cementitious material exits the hollow spine via the at least one substantially laterally extending opening and enters the gap between the inner hollow spine and the outer fabric sleeve such that the outer fabric sleeve expands and deforms laterally and circumferentially to take up the internal shape and form of the cavity until the cavity, the gap and the hollow spine are filled with cementitious material.

BRIEF DESCRIPTION OF THE DRAWINGS

Embodiments of the invention are further described hereinafter with reference to the accompanying drawings, in which:

FIG. 1 illustrates an internal assembled view of a leading end of a sock anchor unit according to an embodiment of the present invention;

FIG. 2 illustrates an internal assembled view of a trailing end of a sock anchor unit according to an embodiment of the present invention;

FIG. 3 illustrates an external assembled view of a leading end of a sock anchor unit according to an embodiment of the present invention;

FIG. 4 illustrates an external assembled view of a trailing end of a sock anchor unit according to an embodiment of the present invention, FIG. 5 illustrates attachment of the sock to the end of a sock anchor unit according to an embodiment of the present invention.

DESCRIPTION

Figure 6:
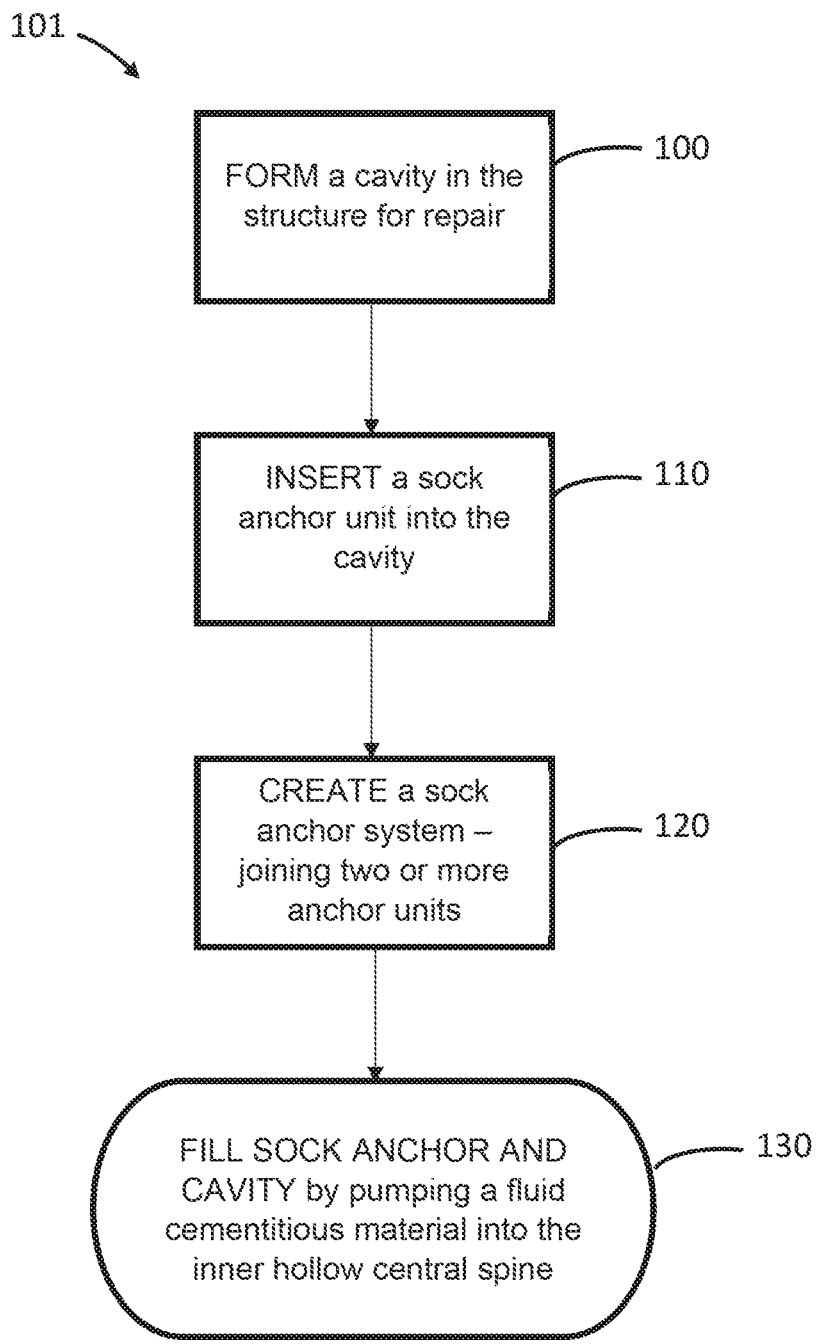
FIG. 6 represents a method of utilising the sock anchor unit to reinforce or repair a structure.

Referring to FIGS. 1 to 5, a sock anchor unit 10 is illustrated. The sock anchor unit 10 includes a longitudinal inner tube 12 (inner hollow member) and an outer fabric sleeve 14 which are arranged substantially concentrically such that a gap is defined between the inner tube 12 and the outer fabric sleeve 14.

The internal components of the sock anchor unit 10 are as illustrated in FIGS. 1 and 2, where the outer fabric sleeve 14 is omitted.

The inner tube 12 provides a central spine that runs from end to end of the anchor unit 10. In the illustrated example, a threaded portion 18 is provided at each end of the inner tube 12. The threaded portions 18 (not visible in FIG. 1) on the inner tube 12 are each provided by an external thread along part of the outer wall of the inner tube 12. In the illustrated example, the inner tube 12 includes an opening 13 through the wall of the tube 12. The opening 13 is located near the leading end 27 of the sock anchor unit 10 and facilitates the transfer of cementitious fluid from inside the inner tube 12 to fill and surround the outside of the inner tube 12, as described further below.

In the illustrated example, the inner tube 12 is metal, for example steel, stainless steel, mild steel etc. and the outer fabric sleeve 14 (see FIGS. 3 to 5) is a fabric sock.

At the leading end 27, the sock anchor unit 10 includes a sleeve 26 attached to the inner tube 12. In the illustrated example, the sleeve 26 includes an internal thread 26a (see FIG. 3) that corresponds with and is compatible with the external threaded portion (not illustrated) of the inner tube 12.

In the illustrated example, the internal thread 26a extends along the whole length of the sleeve 26.

In assembling the interior components of the sock anchor unit 10, the sleeve 26 is partially screwed onto the inner tube 12 at the leading end 27 such that part of the internal thread of the sleeve 26 remains free to facilitate joining two sock anchor units 10, as described further below.

In the illustrated example, the connection of the sleeve 26 and inner tube 12 is further secured, for example by welding 29 the sleeve 26 to the inner tube 12. As illustrated the inner tube 12 and sleeve 26 are welded at the junction of the larger external diameter of the sleeve 26 and the smaller external diameter of the inner tube 12.

The internal diameter and internal thread 26a of the sleeve 26 corresponds with the external diameter and external thread of the inner tube 12.

In the illustrated example, three longitudinal reinforcement members 22 are distributed around the inner tube 12 and are located within the gap 16 between the outer fabric sleeve 14 and the inner tube 12 when the sock anchor unit 10 is fully assembled (as illustrated in FIGS. 3 to 5).

Each reinforcement member 22 acts as a reinforcement member when the sock anchor unit 10 is installed in a cavity and cementitious material surrounds and embeds the inner tube 12 and the reinforcement members 22, as described further below.

In the illustrated example, each reinforcement member 22 is in the form of a spiral rod, which extends between two caps 24, 25. One cap 24 is located at the leading end of the sock anchor unit 10 and the other cap 25 is located at the trailing end of the sock anchor unit 10. The caps 24, 25 each include an opening 24a. The opening 24a aligns with the hollow bore 28 of the inner tube 12 such that cementitious material can be pumped into anchor unit 10 via the inner tube 12.

The caps 24, 25 are secured to the assembly of the inner tube 12, the sleeve 26 and the reinforcement members 22. The sleeve 26 is welded to the inner face of cap 24 and the inner tube 12 is welded to the inner face of cap 25. The reinforcement members 22 are secured at each end to the respective cap 24, 25 such that the reinforcement members 22 are secure, for example by welding each end to the inner faces of the caps 24, 25.

At the trailing end 31 of the sock anchor unit 10, an externally threaded tubular member 32 extends from the outer face of the cap 25. In the illustrated example, the externally threaded tubular member 32 is an end portion of the inner tube 12, where the end portion protrudes from the outer face of the cap 25.

Each cap 24, 25 includes a circumferential groove 30 towards the external end of the cap 24, 25. The groove 30 facilitates connection of the outer fabric sleeve 14 to the internal assembly comprising the inner tube 12, the sleeve 26, the reinforcement members 22 and the caps 24, 25 as described above.

Referring to FIG. 5, in the illustrated example, the outer fabric sleeve 14 is secured by clamping the fabric material against the cap surface. In the illustrated example, spring clips or circlips 34 operate by pressing a C-shaped clip in each groove 30 to capture and press the sock material 14 into the groove 30 between the spring clip 34 and the groove 30 provided on the caps 24, 25.

In use, the sock anchor unit 10 is inserted into a cavity in a structure requiring structural repair, for example a brick or masonry structure. Typically, the cavity will be oversized compared with the anchor unit 10 such that once the sock anchor unit 10 is inserted into the cavity cementitious fluid is pumped through the inner tube 12 and exits the inner tube 12 via the opening 13 to allow cementitious fluid to fill the cavity and to deform the sock fabric 14 radially and circumferentially such that the sock fabric 14 is pressed against the internal surface of the cavity in which the sock anchor unit 10 is inserted.

The sock anchor unit 10 described above and illustrated is versatile because it can be used in the above application as a single unit or it can be combined with additional units to provide a longer sock anchor.

Two or more sock anchor units 10 can be joined trailing end 31 to leading end 27. The assembly of a sock anchor system (not illustrated) comprising two or more sock anchor units 10 is done by inserting the trailing end of a first sock anchor unit 10 into the leading end of a second sock anchor unit 10 and screwing them together to secure.

The trailing end of the final sock anchor unit in the assembly facilitates connection to a pump for inserting the cementitious material into the cavity in which the assembly is inserted.

The caps 24, 25, the sleeves 22 and the inner tube 12 of each sock anchor unit 10 are hollow. Therefore, when assembled a substantially constant hollow bore is provided such that filling with a cementitious material can be carried out in the same way, if it is one, two, ten or more sock anchor units 10 that are installed in a cavity.

The individual sock anchor units 10, may be manufactured in varying lengths, for example 250 mm, 500 mm, 1000 mm etc. It will be appreciated that such lengths are easily transportable and can be joined together to provide a desired longer length sock anchor on site.

FIG. 6 illustrates a method (101) for utilising the sock anchor unit 10 to reinforce or repair a structure in the manner described above. The method (101) comprises forming (100) a cavity in the structure for repair and inserting (110) a sock anchor unit 10 into the cavity. Depending on the length/depth of the cavity, a number of sock anchor units 10 may be required to fill the length/depth of the cavity.

When more than one sock anchor unit 10 is required the method involves the step of creating a sock anchor system (120) by inserting a further sock anchor unit 10 into the cavity and joining the leading end 27 of a the further sock anchor unit 10 to the trailing end 31 of a sock anchor unit 10 already inserted in the cavity. The sock anchor system includes two or more anchor units 10 joined together end to end, wherein each sock anchor unit 10 is as described above with reference to FIGS. 1 to 5. Once the cavity is occupied by one or more sock anchor units 10 the method (101) is completed by filling the sock anchor unit/units 10 by pumping (130) a fluid cementitious material into the inner tube(s) 12 such that the fluid cementitious material exits tube(s) 12 via the laterally extending opening(s) 13 and fills the gap between the tube(s) 12 and the outer fabric sleeve(s) 14 such that the outer fabric sleeve(s) 14 expand, deforming laterally and circumferentially to take up the internal shape and form of the cavity until the cavity, the gap and the inner tube(s) 12 are filled with cementitious material.

Although a variety of embodiments have been described herein, these are provided by way of example only, and many variations and modifications on such embodiments will be apparent to the skilled person and fall within the scope of the present invention, which is defined by the appended claims and their equivalents.

The invention claimed is:

1. A sock anchor unit comprising:
   an inner longitudinal hollow central spine comprising at least one substantially laterally extending opening from inside to outside of the inner hollow central spine;
   an outer fabric sleeve arranged to envelop the outside surface of the inner hollow central spine such that a gap is defined between the outside surface of the inner hollow central spine and an inner surface of the outer fabric sleeve;
   a plurality of elongated reinforcing members, wherein each elongated reinforcing member extends longitudinally within the gap between the inner hollow central spine and the outer fabric sleeve; and
   a fastening member on each end of the sock anchor unit, the fastening members including a leading end fastener member and a trailing end fastening member, wherein both fastening members are hollow and form a continuation of the inner hollow central spine and are compatible with each other wherein the fastening members are configured such that a trailing end of a sock anchor unit is attachable to a leading end of a further sock anchor unit such that a sock anchor system of a desired length can be created,
   wherein a trailing end of the sock anchor unit facilitates filling the cavity and the sock anchor unit with cementitious material, and wherein, in use, cementitious material can be pumped through the trailing end fastener and the hollow central spine, such that the cementitious material can exit the laterally extending opening in the hollow central spine to allow the cementitious material to fill the gap, and deform the outer fabric sleeve to conform the cavity.

2. The sock anchor unit as claimed in claim 1, wherein the fastening members comprise threaded members, wherein an it thread is provided on the fastening member on a first end of the sock anchor unit and an external thread is provided on the fastening member on a second end of the sock anchor unit, wherein two or more sock anchor units can be joined together by attaching the internal threaded end of a first sock anchor unit to the external threaded end of a second sock anchor unit.

3. The sock anchor unit as claimed in claim 2, wherein the fastening members form part of the inner hollow central spine, wherein the inner hollow central spine comprises a section of increased cross-sectional area at one end, wherein the internal thread is provided on the inner surface of the section of increased cross-sectional area.

4. The sock anchor unit as claimed in claim 2, wherein the inner hollow central spine comprises a section of reduced cross-sectional area at the first end, wherein the external thread is provided on an outer surface of the section of reduced cross-sectional area and the internal thread is provided on the second of the inner hollow central spine such that sock anchor units can be joined end to end.

5. The sock anchor unit as claimed in claim 2, wherein one fastening member is provided by an internally threaded sleeve, Wherein at least the first end of the inner hollow central spine includes an externally threaded portion, wherein the externally threaded portion of the inner hollow central spine of a first anchor unit is receivable in one end of the internally threaded sleeve and a first end of a second sock anchor nit is receivable in the other end of the internally threaded sleeve.

6. The sock anchor unit as claimed in claim 1, further comprising a cap on each end, wherein the outer fabric sleeve is secured at each end to each cap thereby facilitating connection of the outer fabric sleeve along the length of the sock anchor unit.

7. The sock anchor unit as claimed n claim 6, wherein each cap comprises a circumferential groove configured to receive a portion of the fabric outer sleeve and a mechanical fastener, wherein the mechanical fastener is arranged to secure the outer fabric sleeve to each cap by clamping the portion of the outer fabric sleeve within the groove, wherein the portion of fabric outer sleeve is sandwiched between the cap and the mechanical fastener.

8. The sock anchor unit as claimed in claim 7, wherein the mechanical fastener is a resilient member that is received within the groove of the cap where at the resilient member is operable to clamp the portion of fabric outer sleeve against the cap.

9. The sock anchor unit as claimed in claim 7, wherein the mechanical fastener is a circlip.

10. The sock anchor unit as claimed in claim 6, wherein each reinforcement member extends between the inner faces of each cap.

11. The sock anchor unit as claimed in 6, wherein the fastening members are provided by an internal connection at a first end of the sock anchor unit and a protruding connection at a second end of the sock anchor unit, and wherein the protruding connection protrudes from an external face of one of the caps.

12. The sock anchor unit as claimed in claim 6, further comprising a cap on each end, wherein the protruding connection is provided by an end of the inner hollow central spine, passing through the cap.

13. The sock anchor unit as claimed in claim 12, wherein the protruding connection comprises an external threaded connection operable to join with an internal threaded connection at the end of another sock anchor unit.

14. The sock anchor unit as claimed in claim 1, wherein a longitudinal axis of each elongated reinforcing member is substantially parallel to a longitudinal axis of the hollow central spine.

15. The sock anchor it as claimed in claim 1, wherein each elongated reinforcement member comprises a textured surface finish.

16. The sock anchor unit as claimed in claim 15, wherein each elongated reinforcement member comprises a spiral rod.

17. The sock anchor unit as claimed in claim 1, comprising at least three reinforcement members.

18. The sock anchor unit as claimed in claim 1, wherein the inner hollow central spine is metal.

19. The sock anchor unit as claimed in claim 1, wherein each elongated reinforcing member is metal.

20. The sock anchor unit as claimed in claim 1, wherein the fastening members are provided by an internal connection at a first end of the sock anchor unit and a protruding connection at a second end of the sock anchor unit.

21. The sock anchor system comprising two or more sock anchor units according to claim 1, wherein a trailing end of a first anchor unit is fastened to a leading end of a second anchor unit.

22. A method of reinforcing or repairing a structure comprising the steps of:
forming a cavity in the structure for repair;
inserting a sock anchor unit into the cavity;
creating a sock anchor system by inserting a further sock anchor unit into the cavity and joining the further sock anchor unit to the sock anchor unit already inserted in the cavity, wherein the sock anchor system includes two or more anchor units joined together end to end, wherein each sock anchor unit comprises an inner elongated hollow central spine comprising at least one substantially laterally extending opening from inside to outside of the inner hollow central spine; an outer fabric sleeve enveloping the outside surface of the inner hollow central spine thereby defining a gap between the inner hollow central spine and the outer fabric sleeve; a plurality of elongated reinforcing members, wherein each elongated reinforcing member extends longitudinally within the gap; and a fastening member on each end of the sock anchor unit, wherein both fastening members are compatible with each other and each fastening member is configured such that a first end of a first anchor unit is attachable to a second end of a second anchor unit thereby facilitating creating a sock anchor system of a desired, length comprising a plurality of sock anchor units; and
pumping a fluid cementitious material into the inner hollow central spine such that the fluid cementitious material exits the hollow central spine via the at least one substantially laterally extending opening and enters the gap between the inner hollow central spine and the outer fabric sleeve such that the outer fabric sleeve expands and deforms laterally and circumferentially to take up the internal shape and firm of the cavity until the cavity, the gap and the hollow central spine are filled with cementitious material.

23. A sock anchor system comprising:
two or more sock anchor units joined end to end, the sock anchor units including a first sock anchor unit and a final sock anchor unit, wherein each sock anchor unit includes an inner longitudinal hollow central spine comprising at least one substantially laterally extending opening from inside to outside of the inner hollow central spine, an outer fabric sleeve arranged to envelop the outside surface of the inner hollow central spine such that a gap is defined between the outside surface of the inner hollow central spine and an inner surface of the outer fabric sleeve, a plurality of elongated reinforcing members, wherein each elongated reinforcing member extends longitudinally within the gap between the inner hollow central spine and the outer fabric sleeve, and a fastening member on each end of the sock anchor unit, wherein both fastening members are hollow and, form a continuation of the inner hollow central spine and are compatible with each other such that a trailing end of a sock anchor unit is attachable to a leading end of a further sock anchor unit;
wherein, in use, a trailing end of the final sock anchor unit facilitates filling the cavity and the sock anchor system with cementitious material, wherein cementitious material can be pumped through the trailing end fastener and each inner hollow central spine, such that the cementitious material can exit the laterally extending openings in the inner hollow central spines to allow the cementitious material to fill the gap, and deform the outer fabric sleeve of each sock anchor unit to conform to the cavity.

* * * * *